United States Patent [19]

Orchard

[11] Patent Number: 4,842,190
[45] Date of Patent: Jun. 27, 1989

[54] CONTROL CIRCUIT FOR A FORCED-AIR HEATING SYSTEM

[75] Inventor: Kenneth L. Orchard, Beaverton, Oreg.

[73] Assignee: Ortech Industries, Inc., Aloha, Oreg.

[21] Appl. No.: 185,118

[22] Filed: Apr. 22, 1988

[51] Int. Cl.⁴ .................. F23N 5/18; F04B 21/00
[52] U.S. Cl. .................... 236/11; 110/186;
 110/190; 318/806; 417/63; 388/910; 388/917;
 388/934
[58] Field of Search ............. 236/11, 10, 15 BA, 35;
 62/228.4, 215, 183; 417/44, 45, 42, 63; 318/334;
 110/186, 190; 431/78

[56] References Cited

U.S. PATENT DOCUMENTS

| | | | |
|---|---|---|---|
| 2,835,447 | 11/1953 | Calahan | 236/11 X |
| 2,838,243 | 12/1954 | Peters | 236/10 |
| 3,726,473 | 4/1973 | Sapir | 236/11 |
| 3,801,888 | 4/1974 | Faulkner | 318/334 |
| 3,896,359 | 7/1975 | Olander et al. | 318/334 |
| 3,912,162 | 10/1975 | Bauer et al. | 236/11 |
| 4,123,000 | 10/1978 | Miller | 236/11 |
| 4,137,770 | 2/1979 | Trout | 307/310 |
| 4,373,662 | 2/1983 | Bassett et al. | 236/10 |
| 4,397,201 | 8/1983 | Mann | 417/42 X |

Primary Examiner—William E. Wayner
Attorney, Agent, or Firm—Dellet, Smith-Hill and Bedell

[57] ABSTRACT

A control circuit for a forced-air heating system comprises a silicon diode that is positionable in thermally-conductive relationship with the interior space of a furnace plenum. A current source supplies current to the silicon diode, and the potential drop across the silicon diode is sensed. The operating speed of the blower is controlled in response to the voltage drop across the silicon diode in a manner such that when the temperature in the plenum is below a first level, the blower is not driven; when the temperature reaches the first level, the blower is driven at a first speed; and when the temperature reaches a second level, which is higher than the first level, the blower is driven at a second speed, which is higher than the first speed.

27 Claims, 2 Drawing Sheets

CONTROL CIRCUIT FOR A FORCED-AIR HEATING SYSTEM

BACKGROUND OF THE INVENTION

This invention relates to a control circuit for a forced-air heating system.

A conventional domestic forced-air central heating system comprises a furnace in which fuel is burned to generate heat, a plenum defining an interior space which is in heat exchange relationship with the furnace and has an inlet chamber and an outlet chamber, ducting in open communication with the inlet chamber and the outlet chamber, and an electrically-driven blower for creating a flow of air through the plenum and the ducting. A room thermostat senses the temperature existing in a living space served by the heating system, and if the sensed temperature falls below a set temperature the room thermostat issues a command to the furnace to cause fuel to be burned. The motor that drives the blower is controlled by a temperature sensor in the plenum. The plenum temperature sensor may employ a bimetallic strip. If the sensed plenum temperature exceeds a set value, the blower motor is energized; otherwise it is not energized. Typically, the blower motor is energized when the plenum temperature reaches about 57° C.

It is conventional for a room thermostat to have a so-called night-time set-back, such that the temperature in the living space is permitted at night to fall below the normal daytime occupation temperature. When the room thermostat first calls for heat in the morning, the air in the ducting is cold. Therefore, when the blower motor is turned on, a current of cold air is driven into the living space and this may cause discomfort to occupants of the living space.

The furnace of a domestic forced-air central heating system may employ gas or oil as the fuel. When the room thermostat of a gas or oil fired central heating system calls for additional heat, a control valve for supplying fuel to the furnace is opened and the fuel is ignited, e.g. by a pilot flame. Another fuel that is used in domestic central heating systems is wood pellets. A wood pellet furnace employs a feed mechanism, such as an auger, for feeding pellets to a fire grate and a draft-inducing fan for maintaining a current of air through the fire grate to support combustion. Normally, operation of the pellet feed mechanism and the draft inducer are controlled by the room thermostat. When the room thermostat does not call for heat, the draft inducer is turned off and the pellet feed mechanism delivers fuel at a very low rate, sufficient only to maintain a pilot fuel in the grate. There is a danger that the pilot fire will be extinguished. However, the feed mechanism will continue to deliver pellets, with the result that the grate will be filled with pellets and the furnace cannot be operated again without removing almost all the pellets and re-lighting the pilot fire.

SUMMARY OF THE INVENTION

A preferred embodiment of the present invention is a control circuit for a forced-air heating system having a furnace, a plenum defining an interior space which is in heat exchange relationship with the furnace, and an electrically-driven blower for establishing a flow of air through the plenum. The control circuit comprises a silicon diode that is positionable in thermally-conductive relationship with the interior space of the plenum, means for supplying current to the silicon diode, means for sensing the potential drop across the silicon diode, and means for controlling the operating speed of the blower in response to the voltage drop across the silicon diode in a manner such that when the temperature in the plenum is below a first level, the blower is not driven; when the temperature reaches the first level, the blower is driven at a first speed; and when the temperature reaches a second level, which is higher than the first level, the blower is driven at a second speed, which is higher than the first speed.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
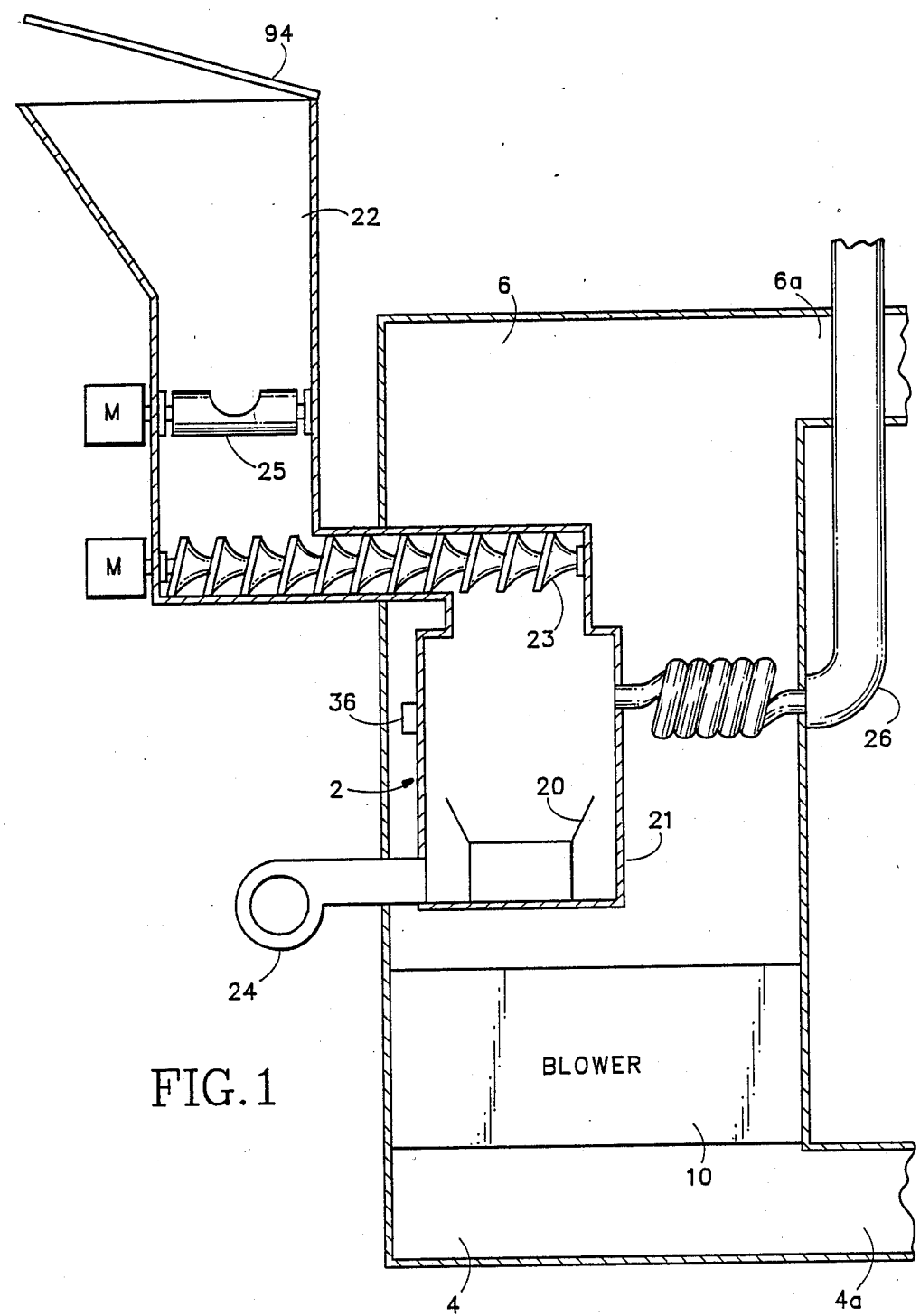
FIG. 1 is a simplified illustration of a domestic forced-air central heating system having a wood pellet furnace.

The illustrated forced-air central heating system comprises a furnace 2 which is disposed in a plenum having an inlet chamber 4 and an outlet chamber 6. Ducts 4a and 6a provide communication between the chambers 4 and 6 and a living space, in which a room thermostat (not shown) is positioned. A blower 10 having an electrically-driven motor 14 (FIG. 2) is mounted in the plenum, between the chambers 4 and 6, and, when driven, forces air to flow upwardly past the furnace 2 and to circulate through the chamber 6, the duct 6a, the living space, the duct 4a and the chamber 4. As the air passes the furnace, it is warmed by exchange of heat with the furnace. The operating speed of the blower motor 14 depends on the firing angle of a thyristor 52 which is connected between an AC supply line and the motor 14.

The furnace itself comprises a firebox 21 containing a grate 20 which receives pellets that are fed into the furnace from a storage hopper 22 by an auger feed mechanism 23. Pellets are dropped into the auger feed mechanism by an electrically-driven spoon 25. A draft-inducing fan 24 delivers air into the furnace, and a flue 26 allows combustion gases to leave the furnace.

Figure 2:
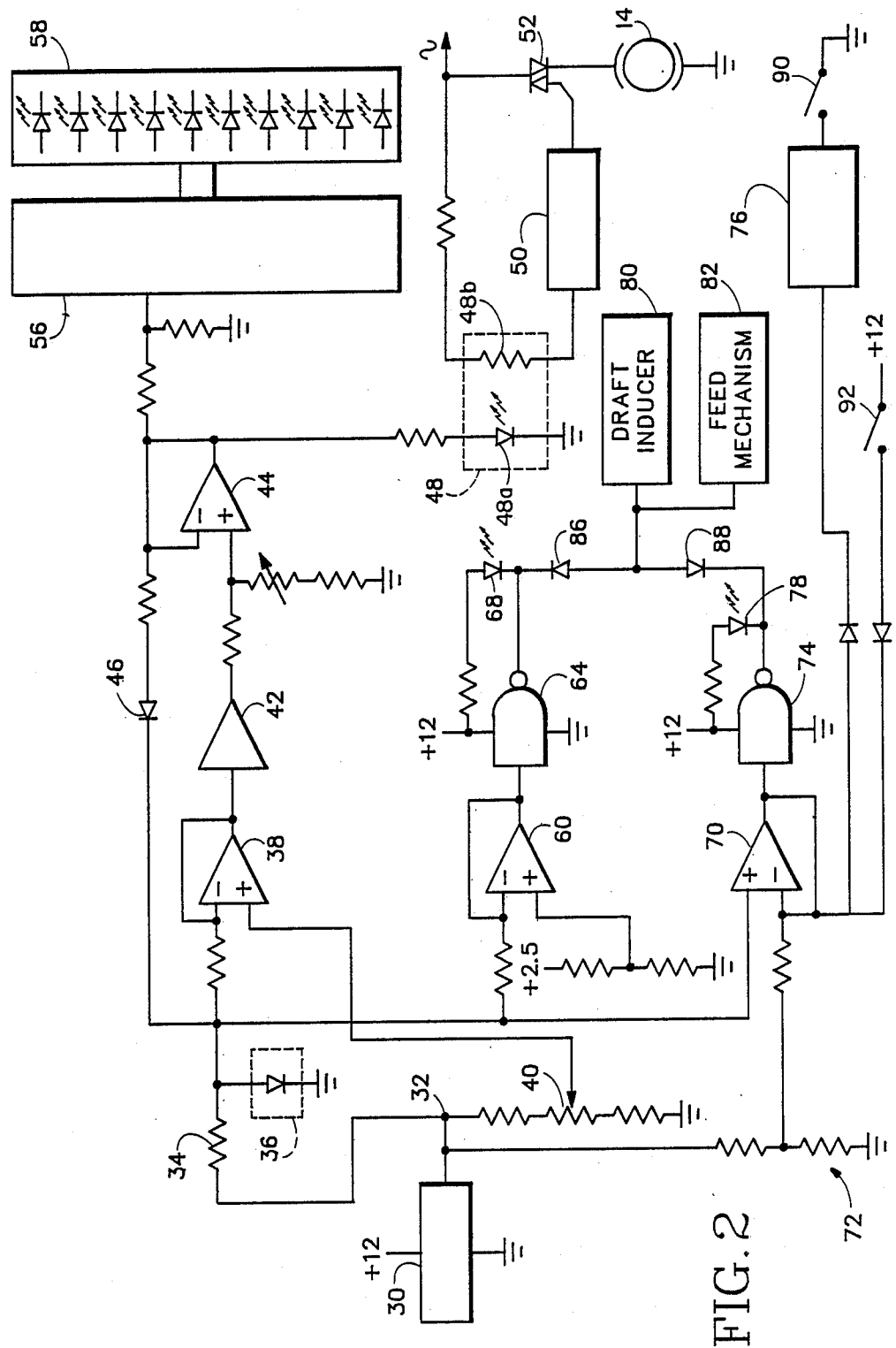
FIG. 2 is a schematic diagram of a control circuit for the central heating system shown in FIG. 1.

The control circuit shown in FIG. 2 comprises a power supply 30 which provides a stable DC output voltage at its output terminal 32. The output terminal 32 is connected to ground through a resistor 34 and a silicon diode 36. The resistor 34 and the power supply 30 constitute a current source which supplies a constant current to the diode 36. As shown in FIG. 1, the silicon diode is positioned in heat exchange relationship with the furnace 2. The forward voltage drop across the silicon diode varies substantially linearly with the temperature ($-2.2$ vm/°C.), and therefore as the temperature of the furnace increases, the voltage at the anode of the diode 36 decreases substantially linearly. The diode 36 thus serves as a temperature sensor.

The anode of the diode 36 is connected to the inverting input terminal of a differential amplifier 38. The non-inverting input terminal of the amplifier 38 is connected to the movable contact of a potentiometer 40 which is connected in a voltage divider between the terminal 32 and ground. The output voltage of the amplifier 38 thus represents the difference between the temperature sensed by the diode 36 and a set temperature established by the position of the movable contact of the potentiometer 40. The output terminal of the amplifier 38 is connected to the input terminal of a Schmitt trigger circuit 42. The output voltage of the Schmitt trigger circuit 42 goes sharply high when the output voltage of the amplifier 38 reaches a preset threshold level, which occurs when the temperature in the heat exchanger reaches a preset level. The temperature at which the output voltage of the Schmitt trigger circuit 42 goes high depends on the setting of the potentiometer 40, and it may be, for example, about 57° C. The Schmitt trigger circuit 42 is designed with hysteresis, so that when the temperature in the heat exchanger is falling, its output voltage goes low at a lower temperature, e.g. 52° C., than the temperature at which its output voltage went high when the temperature in the heat exchanger was increasing.

The output terminal of the Schmitt trigger circuit 42 is connected to the non-inverting terminal of a second differential amplifier 44. The inverting input terminal of the amplifier 44 is connected through a diode 46 to the anode of the diode 36. When the output voltage of the Schmitt trigger circuit 42 is low, the output voltage of the amplifier 44 is low. When the output voltage of the Schmitt trigger circuit 42 goes high, the output voltage of the amplifier 44 undergoes a step-form increase, and thereafter increases linearly as the temperature in the heat exchanger increases and the voltage at the anode of the diode 36 accordingly decreases.

The output terminal of the amplifier 44 is connected to an optoisolator 48. The optoisolator 48 comprises a light-emitting diode 48a in optically-coupled relationship with a photosensitive resistor 48b. The resistor 48b is connected between the AC supply line and a control circuit 50 which provides an output signal comprising a pulse train at line frequency and of which the duty cycle depends on the resistance of the resistor 48b. The output signal of the control circuit is applied to the control electrode of the thyristor 52. Accordingly, as the output voltage of the amplifier 44 increases, and the current flowing through the diode 48a increases, the firing angle of the thyristor 52 decreases. The control circuit 50 is configured so that when the output voltage of the amplifier 44 undergoes its step-form increase in response to the output voltage of the Schmitt trigger circuit 42 going high, the firing angle of the thyristor 52 is approximately 180° and accordingly the motor 14 is driven at approximately half its maximum speed. When the temperature sensed by the diode 36 reaches 104° C., the firing angle is zero, and the motor is driven at full speed. Therefore, when the room thermostat first calls for heat at the end of a setback period, the blower fan is driven at half speed. Because the blower is initially driven at half speed, the rate at which air is circulated through the living space is less than in conventional systems, and the plenum heats up more rapidly than in conventional systems. Therefore, discomfort due to cold drafts is alleviated.

The output voltage of the amplifier 44 is also applied to an LED bar graph display driver 56, which is coupled to an LED bar graph display 58. As the temperature of the furnace increases, the number of LEDs in the bar graph display increases, and consequently a visual indication is given of the blower speed and hence of the condition in the furnace.

The anode of the diode 36 is also connected to the inverting input terminal of a differential amplifier 60 whose non-inverting input terminal is connected to a potential divider 62. The output voltage of the amplifier 60 increases linearly with the temperature of the furnace. The output terminal of the amplifier 60 is connected to a Schmitt trigger circuit 64, which is configured without hysteresis, and whose output terminal goes low sharply when the sensed temperature reaches a preset maximum value, e.g. 132° C. A red LED 68 is connected between the terminal 32 of the power supply 30 and the output terminal of the Schmitt trigger circuit 64, and is accordingly illuminated when the sensed temperature reaches 132° C. The anode of the diode 36 is further connected to the non-inverting input terminal of a differential amplifier 70 whose inverting input terminal is connected to a potential divider 72, a timing circuit 76 and a safety lock-out switch 92. Assuming that the switch 92 is open and the output voltage of the timer 76 is low, the output voltage of the amplifier 70 decreases linearly with the increase in temperature of the furnace. The output terminal of the amplifier 70 is connected to a further Schmitt trigger circuit 74, which is configured without hysteresis and whose output goes sharply low when the temperature sensed by the diode 36 falls to a preset minimum value, e.g. about 38° C. A green LED 78 is connected between the output terminal of the Schmitt trigger circuit 74 and the terminal 32 and is accordingly illuminated when the sensed temperature falls below 38° C.

The output terminals of the Schmitt trigger circuits 64 and 74 are connected through Schottky-barrier diodes 86 and 88 to control circuits 80,82 for the draft inducer 24 and the pellet feed mechanism 23,25. If the connection point of the diodes 86 and 88 is low, neither the draft inducing fan nor the feed mechanism is operated. If the connection point is high, operation of the draft inducing fan and the feed mechanism is controlled by the room thermostat; if the room thermostat calls for heat, the control circuits 80 and 82 cause the motors for the feed mechanism 23,25 and the draft inducing fan 24 to operate. It will therefore be seen that if the temperature sensed by the diode 36 exceeds 132° C., supply of fuel to the furnace and operation of the draft inducing fan are both stopped, to prevent overheating of the furnace. If the temperature falls below 38° C., indicating that there is no fire burning in the furnace and therefore no fuel should be supplied because it will not be burned, the feed mechanism is stopped, even if the room thermostat is calling for heat, and incidentally the draft inducing fan also is stopped.

The timer 76 is controlled by a reset button 90. When the reset button is pressed, the output signal of the timer goes high and remains high for about six minutes. Accordingly, even if the temperature sensed by the diode 36 is below 38° C., both the draft inducer and the fuel feed mechanism will operate, in order to allow the pilot fire to be lit.

The switch 92 is positioned beneath the lid 94 of the hopper 22, and is closed when the lid is raised. When the switch 92 is closed, the feed mechanism 23,25 is stopped. This provides a safety interlock to prevent injury, for example if someone reaches into the fuel hopper.

It will be appreciated that the present invention is not restricted to the particular embodiment that has been described and illustrated, and that variations may be made therein without departing from the scope of the invention as defined in the appended claims and equivalents thereof.

I claim:

1. A control circuit for a heating system having a furnace, a plenum defining an interior space which is in heat exchange relationship with the furnace, and an electrically-driven blower for establishing a flow of air through the plenum, the control circuit comprising:
   a sensor device that is positionable in thermally-conductive relationship with the interior space of the plenum for sensing the temperature in the plenum,
   means for controlling the operating speed of the blower in response to the temperature sensed by the sensor device, and
   a display device for providing a visually-discernible display of the operating speed of the blower.

2. A control circuit according to claim 1, wherein the sensor device is operative to develop a voltage signal that depends on the temperature of the sensor device, and the display device is responsive to said voltage signal.

3. A control circuit according to claim 2, wherein the voltage signal is a potential drop that is developed across the sensor device when current flows through the sensor device, the control circuit comprises a first amplifier that has at least one input terminal connected to the sensor device and also has an output terminal, and the means for controlling the operating speed of the blower comprise a Schmitt trigger circuit having an output terminal and also having an input terminal connected to the output terminal of the first amplifier, a differential amplifier having an output terminal, a first input terminal connected to the output terminal of the Schmitt trigger circuit, and a second input terminal connected to the sensor device, and a blower speed control circuit connected to the output terminal of the differential amplifier, the output terminal of the differential amplifier also being connected to the display device.

4. A control circuit according to claim 1, comprising means for generating a signal dependent on the temperature sensed by the sensor device, and wherein the means for controlling the operating speed of the blower comprises a blower speed control circuit connected to receive the signal dependent on the temperature sensed by the sensor device, the display device also being connected to receive the signal dependent on the temperature sensed by the sensor device.

5. A control circuit according to claim 1, for a furnace with an electrically-driven draft inducer and a solid fuel feed mechanism, comprising means for providing a signal to disable the draft inducer and the feed mechanism in the event that the temperature sensed by the sensor device falls below a first level or reaches a second level, which is higher than the first level.

6. A control circuit for a heating system having a furnace, a plenum defining an interior space which is in heat exchange relationship with the furnace, and an electrically-driven blower for establishing a flow of air through the plenum, the control circuit comprising:
   a sensor device that is positionable in thermally-conductive relationship with the interior space of the plenum, the sensor device being operative to develop a voltage signal that depends on the temperature of the sensor device,
   a first amplifier connected to receive said voltage signal, the first amplifier having at least one input terminal connected to the sensor device and having an output terminal, and
   means for controlling the operating speed of the blower, comprising a Schmitt trigger circuit having an output terminal and also having an input terminal connected to the output terminal of the first amplifier, a differential amplifier having an output terminal, a first input terminal connected to the output terminal of the Schmitt trigger circuit, and a second input terminal connected to the sensor device, and a blower speed control circuit connected to the output terminal of the differential amplifier.

7. A control circuit according to claim 6, wherein the means for controlling the operating speed of the blower control the operating speed of the blower in a manner such that when the temperature in the plenum is below a first level, the blower is not driven; when the temperature in the plenum reaches the first level, the blower is driven at a first speed; and when the temperature in the plenum increases from the first level to a second level, the blower is driven at a speed that increases linearly with temperature from the first speed to a second speed.

8. A control circuit according to claim 6, wherein the sensor device comprises a silicon diode having a first electrode, which is connected to a reference potential level, and a second electrode, and the first amplifier is connected to sense the potential of the second electrode.

9. A control circuit according to claim 8, wherein the first amplifier is a differential amplifier having one input terminal connected to the second electrode and another input terminal connected to a reference potential level.

10. A control circuit according to claim 6, further comprising a display device connected to the output terminal of the differential amplifier, the display device being operative to provide a visually-discernible display that depends on the potential of the output terminal of the differential amplifier.

11. A control circuit according to claim 6, for a furnace with an electrically-driven draft inducer and a solid fuel feed mechanism, comprising means for providing a signal to disable the draft inducer and the feed mechanism in the event that the temperature sensed by the sensor device falls below a first level or reaches a second level, which is higher than the first level.

12. A control circuit for a heating system having a furnace with an electrically-driven draft inducer, a plenum defining an interior space which is in heat exchange relationship with the furnace, and an electrically-driven blower for establishing a flow of air through the plenum, the control circuit comprising:
   a sensor device that is positionable in thermally-conductive relationship with the interior space of the plenum for sensing the temperature in the plenum,
   means for controlling the operating speed of the blower in response to the temperature sensed by the sensor device, and
   means responsive to the sensor device for providing a disable signal in the event that the temperature in the plenum reaches a predetermined level, the disable signal being operative to disable the draft inducer.

13. A control circuit according to claim 12, further comprising a display device for providing a visually-discernible display of the operating speed of the blower.

14. A control circuit according to claim 12, wherein the means for controlling the operating speed of the blower operate in a manner such that the blower is not driven when the temperature in the plenum is below a second level, which is lower than said predetermined level, and the blower is driven when the temperature in the plenum reaches the second level.

15. A control circuit according to claim 14, wherein the means for controlling the operating speed of the blower operate in a manner such that the blower is driven at a first speed when the temperature in the plenum reaches the second level and is driven at a higher speed when the temperature in the plenum reaches a third level, which is between the second level and said predetermined level.

16. A control circuit according to claim 15, wherein the means for controlling the operating speed of the blower are operative to increase the operating speed of the blower linearly from the first speed to said higher speed as a function of increase in temperature from the second level to the third level.

17. A control circuit according to claim 12, wherein the means for providing the disable signal also provide the disable signal in the event that the temperature in the plenum falls to a second level, which is lower than said predetermined level.

18. A control circuit according to claim 17, wherein the sensor device is operative to develop a voltage signal that depends on the temperature in the plenum and the means for providing the disable signal comprise an amplifier having an input terminal connected to the sensor device and also having an output terminal at which it provides a signal of which the voltage increases substantially linearly with decrease in temperature and attains a predetermined threshold value when the temperature in the plenum has fallen to the second level, and a Schmitt trigger circuit connected to the output terminal of the amplifier and operative to provide the disable signal when the output voltage of the amplifier attains said predetermined threshold value.

19. A control circuit according to claim 17, comprising selectively operable means for temporarily inhibiting operation of the means for providing the disable signal in the event that the temperature in the plenum has fallen to the second level.

20. A control circuit according to claim 12, for a furnace having a solid fuel feed mechanism, wherein the disable signal is operative to disable the solid fuel feed mechanism.

21. A control circuit according to claim 12, wherein the sensor device is operative to develop a voltage signal that depends on the temperature in the plenum and the means for providing the disable signal comprise an amplifier having an input terminal connected to the sensor device and also having an output terminal at which it provides a signal of which the voltage increases substantially linearly with increase in temperature and attains a predetermined threshold value when the temperature in the plenum reaches said predetermined level, and a Schmitt trigger circuit connected to the output terminal of the amplifier and operative to provide the disable signal when the output voltage of the amplifier attains said predetermined threshold value.

22. A control circuit for a heating system having a furnace with a solid fuel feed mechanism, a plenum defining an interior space which is in heat exchange relationship with the furnace, and an electrically-driven blower for establishing a flow of air through the plenum, the control circuit comprising:
a sensor device that is positionable in thermally-conductive relationship with the interior space of the plenum for sensing the temperature in the plenum,
means for controlling the operating speed of the blower in response to the temperature sensed by the sensor device, and
means responsive to the sensor device for providing a disable signal in the event that the temperature in the plenum reaches a predetermined level, the disable signal being operative to disable the fuel feed mechanism.

23. A control circuit according to claim 22, wherein the means for controlling the operating speed of the blower operate in a manner such that the blower is not driven when the temperature in the plenum is below a second level, which is lower than said predetermined level, and the blower is driven when the temperature in the plenum reaches the second level.

24. A control circuit according to claim 22, wherein the means for providing the disable signal also provide the disable signal in the event that the temperature in the plenum falls to a second level, which is lower than said predetermined level.

25. A control circuit according to claim 24, wherein the sensor device is operative to develop a voltage signal that depends on the temperature in the plenum and the means for providing the disable signal comprise an amplifier having an input terminal connected to the sensor device and also having an output terminal at which it provides a signal of which the voltage increases substantially linearly with decrease in temperature and attains a predetermined threshold value when the temperature in the plenum reaches the second level, and a Schmitt trigger circuit connected to the output terminal of the amplifier and operative to provide the disable signal when the output voltage of the amplifier attains said predetermined threshold value.

26. A control circuit according to claim 23, comprising selectively operable means for temporarily inhibiting operation of the means for providing the disable signal in the event that the temperature in the plenum has fallen to the second level.

27. A control circuit according to claim 22, wherein the sensor device is operative to develop a voltage signal that depends on the temperature in the plenum and the means for providing the disable signal comprise an amplifier having an input terminal connected to the sensor device and also having an output terminal at which it provides a signal of which the voltage increases substantially linearly with increase in temperature and attains a predetermined threshold value when the temperature in the plenum reaches said predetermined level, and a Schmitt trigger circuit connected to the output terminal of the amplifier and operative to provide the disable signal when the output voltage of the amplifier attains said predetermined threshold value.

* * * * *

UNITED STATES PATENT AND TRADEMARK OFFICE
CERTIFICATE OF CORRECTION

PATENT NO. : 4,842,190
DATED : June 27, 1989
INVENTOR(S) : Kenneth L. Orchard

It is certified that error appears in the above-identified patent and that said Letters Patent is hereby corrected as shown below:

```
Column 1, line 52, delete "fuel" and substitute --fire--.

Column 2, line 59, delete "vm/°C" and substitute --mv/°C--.

Column 4, line 39, delete ";" and substitute --:--.

Column 5, line 45, delete "comprises" and substitute
                   --comprise--.
```

Signed and Sealed this

Third Day of April, 1990

*Attest:*

HARRY F. MANBECK, JR.

*Attesting Officer*  *Commissioner of Patents and Trademarks*